US012659724B2

(12) United States Patent　　　　　　(10) Patent No.:　US 12,659,724 B2
Shaheen et al.　　　　　　　　　　　　(45) Date of Patent:　Jun. 16, 2026

(54) METHODS AND APPARATUS FOR REDUCED CAPABILITY SIGNALING IN A 5G NR SYSTEM

(71) Applicant: SHARP KABUSHIKI KAISHA, Sakai City (JP)

(72) Inventors: Kamel M. Shaheen, Vancouver, WA (US); Kai Ying, Vancouver, WA (US); John Michael Kowalski, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 458 days.

(21) Appl. No.: 17/927,363

(22) PCT Filed: May 14, 2021

(86) PCT No.: PCT/JP2021/018446
§ 371 (c)(1),
(2) Date: Nov. 23, 2022

(87) PCT Pub. No.: WO2021/241285
PCT Pub. Date: Dec. 2, 2021

(65) Prior Publication Data
US 2023/0217244 A1　　Jul. 6, 2023

Related U.S. Application Data

(60) Provisional application No. 63/032,405, filed on May 29, 2020.

(51) Int. Cl.
*H04W 8/24*　　　(2009.01)
*H04W 76/10*　　(2018.01)

(52) U.S. Cl.
CPC ............. *H04W 8/24* (2013.01); *H04W 76/10* (2018.02)

(58) Field of Classification Search
CPC ....... H04W 8/24; H04W 76/10; H04W 60/00; H04L 27/26025
See application file for complete search history.

(56) References Cited

U.S. PATENT DOCUMENTS

2018/0317218 A1 * 11/2018 Li ..................... H04W 72/1268
2019/0313239 A1 * 10/2019 Horn ...................... H04W 8/08
(Continued)

FOREIGN PATENT DOCUMENTS

WO　　　2019117791 A1　　6/2019

OTHER PUBLICATIONS

3GPP TS 38.331 V15.9.0 (Mar. 2020) 3rd Generation Partnership Project; Technical Specification Group Radio Access Network; NR; Radio Resource Control (RRC) protocol specification (Release 15).
(Continued)

*Primary Examiner* — Kenneth T Lam
(74) *Attorney, Agent, or Firm* — ScienBiziP, P.C.

(57)　　　　　ABSTRACT

A user equipment (UE) is described. The UE includes transmitting circuitry configured to send a low-capability indication that indicates reduced capabilities of the UE to a 5G New Radio (NR) network. In some examples, multiple low-capability indications may be sent to indicate capabilities of the UE to the 5G NR network. In other examples, a single low-capability indication may be sent in an attach request. The 5G NR network may request the reduced capabilities of the UE in a capability request update. In yet other examples, a single low-capability indication may be sent in a radio resource control (RRC) establishment cause.

3 Claims, 17 Drawing Sheets

(56)      References Cited

U.S. PATENT DOCUMENTS

| | | | | |
|---|---|---|---|---|
| 2020/0077305 | A1* | 3/2020 | Hong | ................ H04W 36/0011 |
| 2020/0367147 | A1* | 11/2020 | Höglund | ............... H04W 48/02 |
| 2021/0243590 | A1* | 8/2021 | Jin | ........................ H04W 8/245 |
| 2022/0278768 | A1* | 9/2022 | Yeo | ........................... H04L 1/00 |
| 2022/0408518 | A1* | 12/2022 | Bergström | .......... H04W 60/005 |
| 2023/0038753 | A1* | 2/2023 | Tan | ................... H04W 74/0833 |

OTHER PUBLICATIONS

Samsung, "Considerations on access barring and UE capability", R1-2003913, 3GPP TSG RAN WG1 #101, e-Meeting, May 25-Jun. 5, 2020.

\* cited by examiner

FIG. 7

METHODS AND APPARATUS FOR REDUCED CAPABILITY SIGNALING IN A 5G NR SYSTEM

CROSS REFERENCE

This Nonprovisional application claims priority under 35 U.S.C. § 119 on provisional Application No. 63/032,405 on May 29, 2020, the entire contents of which are hereby incorporated by reference.

TECHNICAL FIELD

The present disclosure relates generally to communication systems. More specifically, the present disclosure relates to user equipments, base stations and signaling for reduced capability signaling in a 5G New Radio (NR) system.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: transmitting circuitry configured to send a low-capability indication that indicates special feature device of reduced capabilities of the UE to a 5G New Radio (NR) network.

In one example, a base station (gNB), comprising: receiving circuitry configured to receive a low-capability indication that indicates reduced capabilities of a user equipment (UE) to a 5G New Radio (NR) network.

In one example, a method by a user equipment (UE), comprising: sending a low-capability indication that indicates reduced capabilities of the UE to a 5G New Radio (NR) network.

In one example, a method by a base station (gNB), comprising: receiving a low-capability indication that indicates reduced capabilities of a user equipment (UE) to a 5G New Radio (NR) network.

BRIEF DESCRIPTION OF DRAWINGS

FIG. 7 shows examples of scheduling timelines.

DESCRIPTION OF EMBODIMENTS

Figure 1:
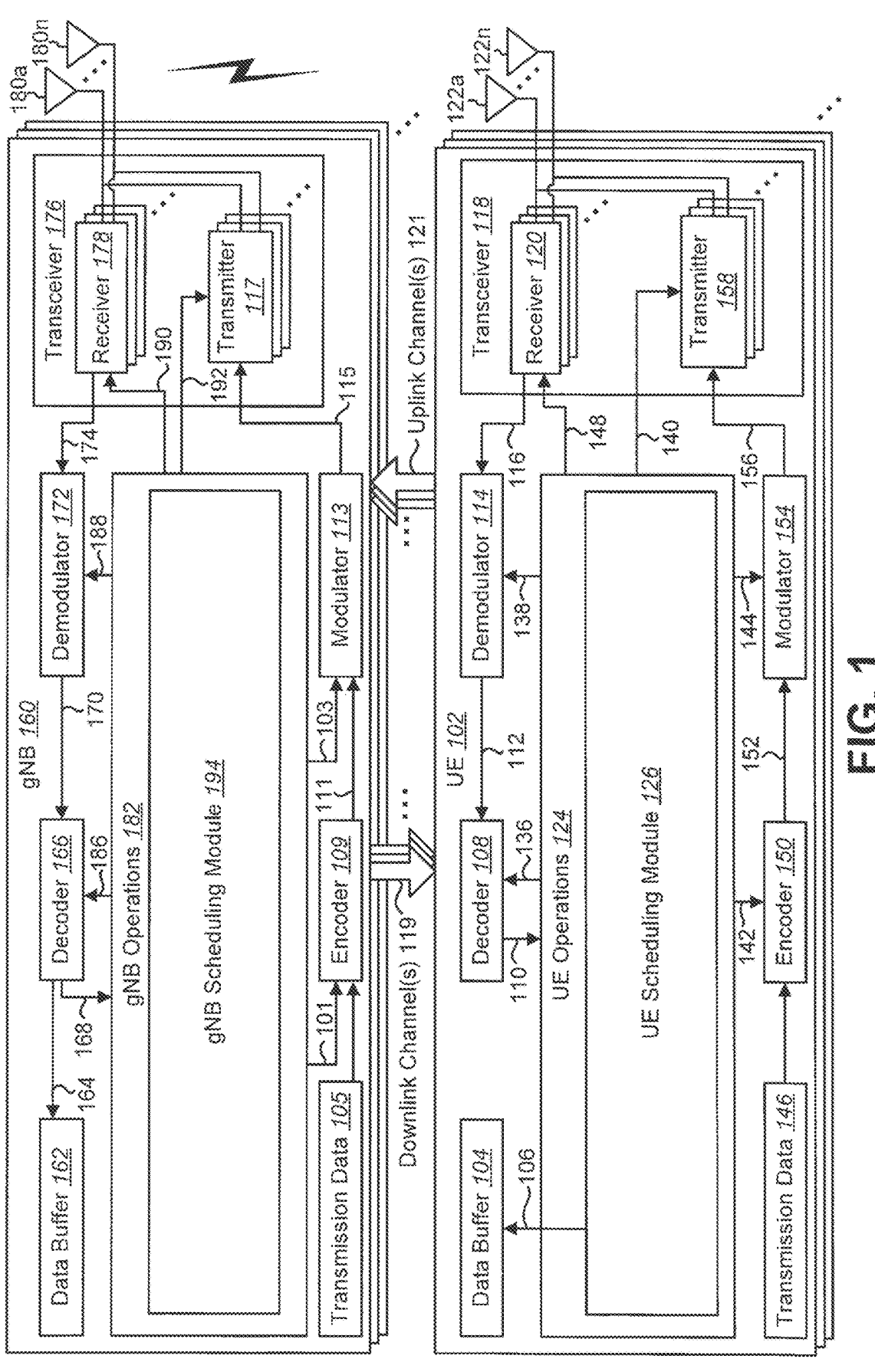
FIG. 1 is a block diagram illustrating one implementation of one or more base stations (gNBs) and one or more user equipments (UEs) for reduced capability signaling in a 5G New Radio (NR) system.

A user equipment (UE) is described. The UE includes transmitting circuitry configured to send a low-capability indication that indicates reduced capabilities of the UE to a 5G New Radio (NR) network.

In some examples, multiple low-capability indications may be sent to indicate capabilities of the UE to the 5G NR network. In other examples, a single low-capability indication may be sent in an attach request. The 5G NR network may request the reduced capabilities of the UE in a capability request update. In yet other examples, a single low-capability indication may be sent in a radio resource control (RRC) establishment cause.

A base station (gNB) is also described. The gNB includes receiving circuitry configured to receive a low-capability indication that indicates reduced capabilities of a UE to a 5G NR network.

A method by a UE is also described. The method includes sending a low-capability indication that indicates reduced capabilities of the UE to a 5G NR network.

A method by a gNB is also described. The method includes receiving a low-capability indication that indicates reduced capabilities of a UE to a 5G NR network.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time, frequency and/or space resources to allow for enhanced mobile broadband (eMBB) communication and ultra-reliable low-latency communication (URLLC) services, as well as massive machine type communication (mMTC) like services. To meet a latency target and high reliability, mini-slot-based repetitions with flexible transmission occasions may be supported. Approaches for applying mini-slot-based repetitions are described herein. A new radio (NR) base station may be referred to as a gNB. A gNB may also be more generally referred to as a base station device.

Some usage scenarios that have been identified for 5G are eMBB, mMTC, and Ultra-Reliable and URLLC. Yet another identified area to locate the boundary between mMTC and URLLC would be time-sensitive communication (TSC). In particular, mMTC, URLLC and TSC are associated with novel internet-of-things (IoT) use cases that are targeted in vertical industries. It is envisaged that eMBB, mMTC, URLLC and TSC use cases may all be supported in the same network.

Narrowband (NB) IoT and LTE M may fulfill IMT-2020 requirements for mMTC and can be certified as 5G technologies. For URLLC support, URLLC features were introduced in Release 15 for both LTE and NR, and NR URLLC is further enhanced in Release 16 within the enhanced URLLC (eURLLC) and Industrial IoT work items. Rel-16 also introduced support for Time-Sensitive Networking (TSN) and 5G integration for TSC use cases.

One important objective of 5G is to enable connected industries. 5G connectivity can serve as a catalyst for the next wave of industrial transformation and digitalization, which improve flexibility, enhance productivity and efficiency, reduce maintenance cost, and improve operational safety. Devices in such environments may include, for example, pressure sensors, humidity sensors, thermometers, motion sensors, accelerometers, actuators, etc. It is desirable to connect these sensors and actuators to 5G networks and core. The massive industrial wireless sensor network (IWSN) use cases and requirements include not only URLLC services with very high requirements, but also relatively low-end services with the requirement of small device form factors, and/or being completely wireless with a battery life of several years. The requirements for these services that are higher than low power wide area (LPWA) (e.g., LTE-MTC and/or Narrowband Internet of Things (LTE-M/NB-IOT)) but lower than URLLC and eMBB.

Similar to connected industries, 5G connectivity can serve as a catalyst for the next wave smart city innovations. As an example, the smart city vertical covers data collection and processing to more efficiently monitor and control city resources, and to provide services to city residents. For example, the deployment of surveillance cameras is part of the smart city and may also be used in factories and industries.

Moreover, a wearables use case may include smart watches, rings, eHealth related devices, and medical monitoring devices etc. One characteristic for this use case is that the device is small in size.

These cases above may have some requirements. The main motivation for the new device type is to lower the device cost and complexity as compared to high-end eMBB and URLLC devices of Rel-15/Rel-16. This is especially the case for industrial sensors. The requirement for most use cases is that the standard enables a device design with compact form factor. Systems should support all FR1/FR2 bands for FDD and TDD.

In addition to these requirements, this disclosure describes some use case-specific requirements. For industrial wireless sensors, communication service availability may be 99.99% and end-to-end latency may be less than 100 ms. The reference bit rate may be less than 2 Mbps (potentially asymmetric e.g., uplink (UL) heavy traffic) for all use cases and the device is stationary. The battery may last at least few years. For safety related sensors, latency requirement may be lower (e.g., 5-10 ms).

Regarding a video surveillance use case, a reference economic video bitrate would be 2-4 Mbps, with a latency less than 500 ms, and a reliability of 99%-99.9%. High-end video (e.g., for farming) may employ 7.5-25 Mbps. It is noted that the traffic pattern is dominated by UL transmissions.

With a wearables use case, a reference bitrate for a smart wearable application may be 10-50 Mbps in downlink (DL) and a minimum of 5 Mbps in the UL. A peak bit rate of a device may be higher (e.g., 150 Mbps for downlink and 50 Mbps for uplink). The battery of the device may last multiple days (e.g., up to 1-2 weeks).

Examples of UE features and parameter lists with lower-end capabilities, relative to Release 16 eMBB and URLLC NR, are described to serve the three use cases mentioned above.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more base stations (gNBs) 160 and one or more user equipments (UEs) 102 for reduced capability signaling in a 5G NR system. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc.

For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. In some examples, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For instance, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE 102 may utilize the UE scheduling module 126 to perform one or more downlink receptions and/or one or more uplink transmissions. The downlink reception(s) may include reception of data, reception of downlink control information, and/or reception of downlink reference signals. The uplink transmissions include transmission of data, transmission of uplink control information, and/or transmission of uplink reference signals.

Examples of UE features and parameter lists with lower-end capabilities, relative to Release 16 eMBB and URLLC NR, are described to serve the three use cases mentioned above. Some examples of UE complexity reduction features may include a reduced number of UE antennas (e.g., RX and/or TX), UE bandwidth reduction, Half-Duplex-FDD, relaxed UE processing time, and/or relaxed UE processing capability. It should be noted that in some implementations, Rel-15 Synchronization Signal/PBCH block (SSB) bandwidth may be reused and L1 changes minimized. Furthermore, these features defined above may not overlap with low power, wide area (LPWA) use cases. The lowest capability considered should be no less than an LTE Category *ibis* modem.

UE power savings and battery lifetime enhancements for reduced capability UEs in applicable use cases (e.g., delay ologies), half-duplex-FDD, relaxed UE processing time, (e.g., a fixed K0, K1, K2, longer K0, K1, K2), relaxed UE processing capability, reduced PDCCH monitoring by smaller numbers of blind decodes and CCE limits, Extended DRX for RRC Inactive and/or Idle, RRM relaxation for stationary devices, coverage recovery to compensate for potential coverage reduction due to the device complexity reduction, a reduced modulation and coding scheme (MCS) table (e.g., a high spectrum efficiency MCS may not be needed), and/or reduced time domain resource allocation table (e.g., limited time domain resource allocations, fixed timing relationship/offset, a new default TDRA table).

Some example solutions to support the above new features and possible scenarios are described herein. In a first solution, an identifier or an index may be defined for each one of the above mentioned capabilities or LOW-CAP index may be implemented. The LOW-CAP UE can indicate that to the network both in a combination of access stratum (AS) and/or non-access stratum (NAS) signaling. In the attach procedure, the LOW-CAP UE may indicate its status as LOW-CAP and/or its LOW-CAP identifier, which may uniquely identify the UE profile and associated capabilities that describe the associated service that the UE is trying to access or provide. The network may follow up with capability update procedures to get the complete list of UE capabilities or a specific portion thereof.

In an example, LOW-CAP=1 (TRUE), LOW-CAP=0 (False), where false means normal operation and TRUE is LOW-CAP operation. Table 1 illustrates LOW-CAP Index binary code that indicates a specific LOW-CAP feature.

TABLE 1

| LOW-CAP index 000 . . . 001 | = Industrial sensors Class 0 (BW=x0 | bit-rate range =y0, . . . etc.) |
|---|---|---|
| LOW-CAP index 000 . . . 010 | = Industrial sensors Class 1 (BW=x1 | bit-rate range =y3, . . . etc.) |
| LOW-CAP index 000 . . . 011 | = Industrial sensors Class 2 (BW=x2 | bit-rate range =y3, . . . etc.) |
| LOW-CAP index 000 . . . 100 | = Industrial sensors Class 3 (BW=x3 | bit-rate range =y3, . . . etc.) |
| LOW-CAP index 000 . . . xxx . . . etc.) | = Video Surveillance Class xx1 (BW=xx1 | bit-rate range =yxx1, |
| LOW-CAP index 000 . . . xx2 . . . etc.) | = Video Surveillance Class xx2 (BW=xx2 | bit-rate range =yxx2, |
| LOW-CAP index 000 . . . zz1 | = Wearables Class zz1 (BW=zz1 | bit-rate range =yzz1, . . . etc.) |
| LOW-CAP index 000 . . . zz2 | = Wearables Class zz2 (BW=zz2 | bit-rate range =yzz2, . . . etc.) |
| LOW-CAP index 000 . . . zz3 | = Wearables Class zz3 (BW=zz3 | bit-rate range =yzz3, . . . etc.) | tolerant) are also described herein. This may include reduced PDCCH monitoring by smaller numbers of blind decodes and Control Channel Element (CCE) limits. Extended discontinuous reception (DRX) for RRC inactive and/or idle may be implemented. Radio resource management (RRM) relaxation may be implemented for stationary devices.

Functionality that will enable the performance degradation of such complexity reduction may be mitigated or limited. This may include coverage recovery to compensate for potential coverage reduction due to the device complexity reduction.

A standardization framework and principles for how to define and constrain reduced capabilities, considering the definition of a limited set of one or more device types and considering how to ensure those device types are only used for the intended use cases, is also described herein. This functionality may allow devices with reduced capabilities to be explicitly identifiable to networks and network operators, and allow operators to restrict their access, if desired.

Some additional UE complexity reduction features may be implemented. These may include a reduced number of UE RX/TX antennas, UE bandwidth reduction (e.g., a limited number of Bandwidth Parts (BWPs), limited numer- In addition to the indexing information included in Table 1, additional indexing information may include a reduced number of UE RX/TX antennas, UE bandwidth reduction, half-duplex-FDD, relaxed UE processing time, and/or relaxed UE processing capability.

In another solution, the LOW-CAP indication may be included in the attach request with the associated QoS and/or QoE profile. The network can then request the complete profile in the capability request update. An example of this approach is described in connection with FIG. 17.

Figure 18:
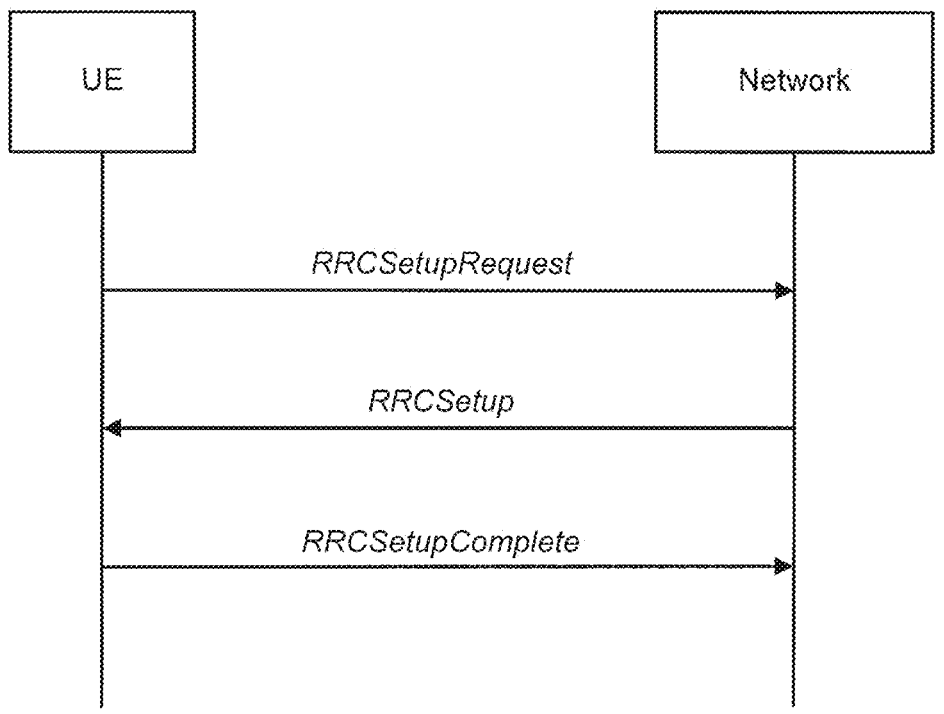
FIG. 18 is a sequence diagram illustrating a radio resource control (RRC) connection establishment procedure.

In yet another solution, LOW-CAP indication may be included in the RRC Establishment cause to inform the network of the triggering service. This approach can be used for devices with multiple services configured and at certain moments the UE triggers the LOW-CAP service establishment, re-establishment, or resume. An example of RRC connection establishment is illustrated in FIG. 18.

The purpose of the RRC connection establishment procedure is to establish an RRC connection. RRC connection establishment involves SRB1 establishment. The procedure is also used to transfer the initial NAS dedicated information and/or message from the UE to the network. The network may apply the procedure when establishing an RRC connection; and/or when the UE is resuming or re-establishing an RRC connection, and the network is not able to retrieve or verify the UE context. In this case, the UE receives may receive RRCSetup and responds with RRCSetupComplete.

The UE may initiate the procedure when upper layers request establishment of an RRC connection while the UE is in RRC_IDLE and it has acquired system information. The UE may ensure having valid and up to date system information before initiating the RRC connection establishment procedure.

Upon initiation of the RRC connection establishment procedure, the UE may perform one or more of the operations described in Listing 1.

---

Listing 1

1> If the upper layers provide an Access Category and one or more Access Identities upon
 requesting establishment of an RRC connection:
  2> Perform the unified access control procedure as specified in 5.3.14 using the Access
   Category and Access Identities provided by upper layers;
   3> If the access attempt is barred, the procedure ends;
1> Apply the default L1 parameter values as specified in corresponding physical layer
 specifications except for the parameters for which values are provided in SIB1;
1> Apply the default MAC Cell Group configuration as specified in 9.2.2;
1> Apply the CCCH configuration as specified in 9.1.1.2;
1> Apply the timeAlignmentTimerCommon included in SIB1;
1> Start timer T300;
1> Initiate transmission of the RRCSetupRequest message in accordance with 5.3.3.3;

---

The RRCSetupRequest message may be used to request the establishment of an RRC connection. The RRC-SetupRequest message may have the following properties:

Signalling radio bearer: SRB0

Radio Link Control (RLC)—Service Access Point (SAP): TM

Logical channel CCCH

Direction: UE to Network

An example of the RRCSetupRequest message is illustrated in Listing 2:

---

Listing 2

-- ASN1START
-- TAG-RRCSETUPREQUEST-START
RRCSetupRequest :: =        SEQUENCE {
  rrcSetupRequest          RRCSetupRequest-IEs
}
RRCSetupRequest-IEs :: =    SEQUENCE {
  ue-Identity              InitialUE-Identity,
  establishmentCause       EstablishmentCause,
  spare                    BIT STRING (SIZE (1))
}
InitialUE-Identity :: =     CHOICE {
  ng-5G-S-TMSI -Part1      BIT STRING (SIZE (39)),
  randomValue              BIT STRING (SIZE (39))
}
EstablishmentCause ::=      ENUMERATED {
  emergency, highPriorityAccess, mt-Access,
  mo-Signalling, mo-Data, mo-VoiceCall, mo-VideoCall,
  mo-SMS, mps-PriorityAccess, mcs-PriorityAccess,
  LOW-CAPAccess, spare6, spare5, spare4, spare3,
  spare2, spare1}
-- TAG-RRCSETUPREQUEST-STOP
-- ASN1STOP

---

In Listing 2, the field descriptions for RRCSetupRequest-IEs may include the following:

establishmentCause provides the establishment cause for the RRCSetupRequest in accordance with the information received from upper layers. gNB is not expected to reject an RRCSetupRequest due to unknown cause value being used by the UE.

ue-Identity included to facilitate contention resolution by lower layers.

In Listing 2, the field descriptions for InitialUE-Identity may include the following:

ng-5G-S-TMSI-Part1 may be the rightmost 39 bits of 5G-S-TMSI.

randomValue may be an integer value in the range 0 to 2³⁹−1.

The IE ResumeCause may be used to indicate the resume cause in RRCResumeRequest and RRCResumeRequest1. An example of the ResumeCause information element is illustrated in Listing 3:

---

Listing 3

-- ASN1START
-- TAG-RESUMECAUSE-START
ResumeCause ::=            ENUMERATED {
  emergency, highPriorityAccess , mt-Access,
  mo-Signalling, mo-Data, mo-VoiceCall, mo-VideoCall,
  mo-SMS, rna-Update, mps-PriorityAccess,
  mcs-PriorityAccess, LOW-CAPAccess , spare1, spare2,
  spare3, spare4, spare5 }
-- TAG-RESUMECAUSE-STOP
-- ASN1STOP

---

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

Figure 2:
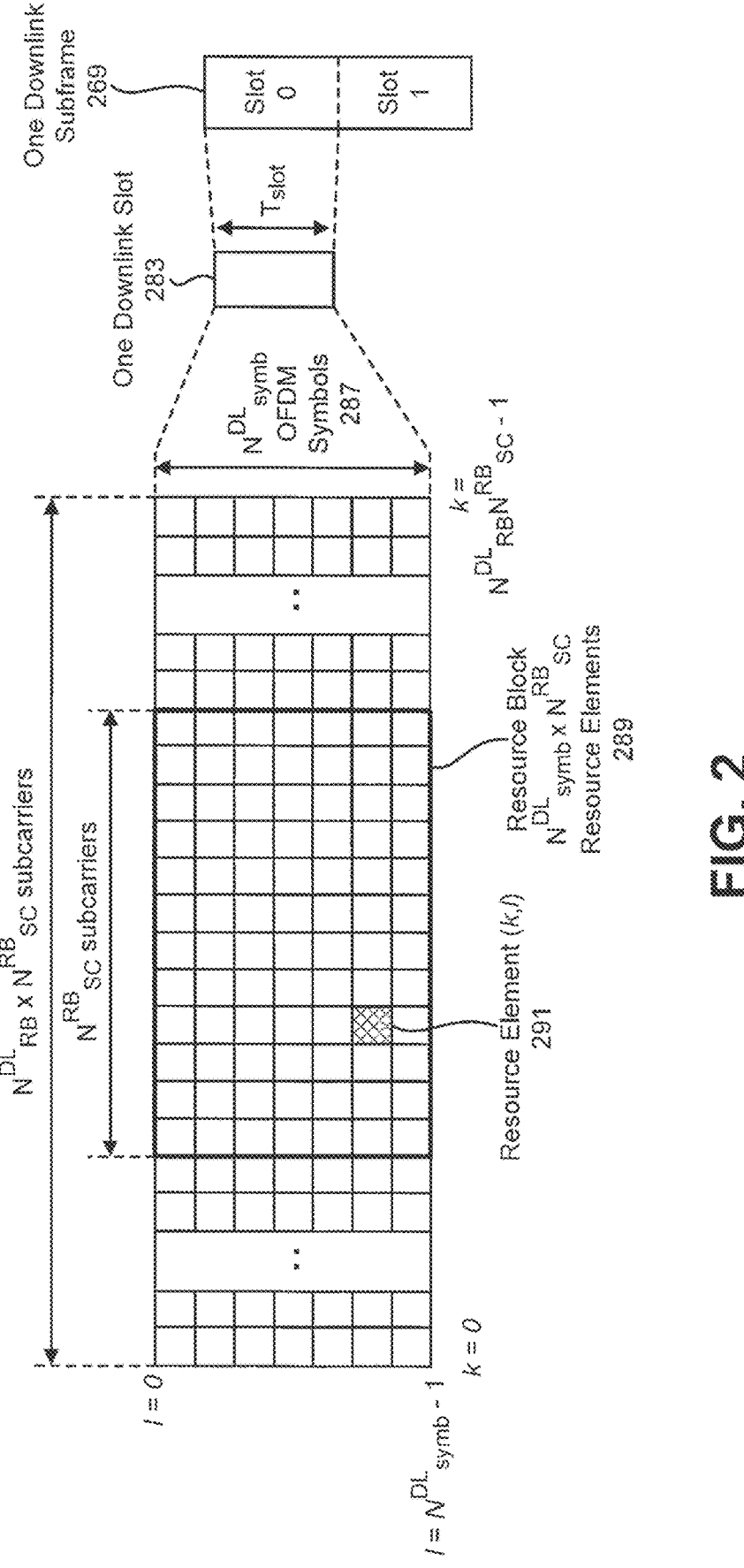
FIG. 2 is a diagram illustrating an example of a resource grid for the downlink.

FIG. 2 is a diagram illustrating one example of a resource grid for the downlink.

The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For a SCell (including a Licensed Assisted Access (LAA) SCell), $N^{DL}_{RB}$ is configured by a RRC message dedicated to a UE 102. For PDSCH mapping, the available RE 291 may be the RE 291 whose index 1 fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
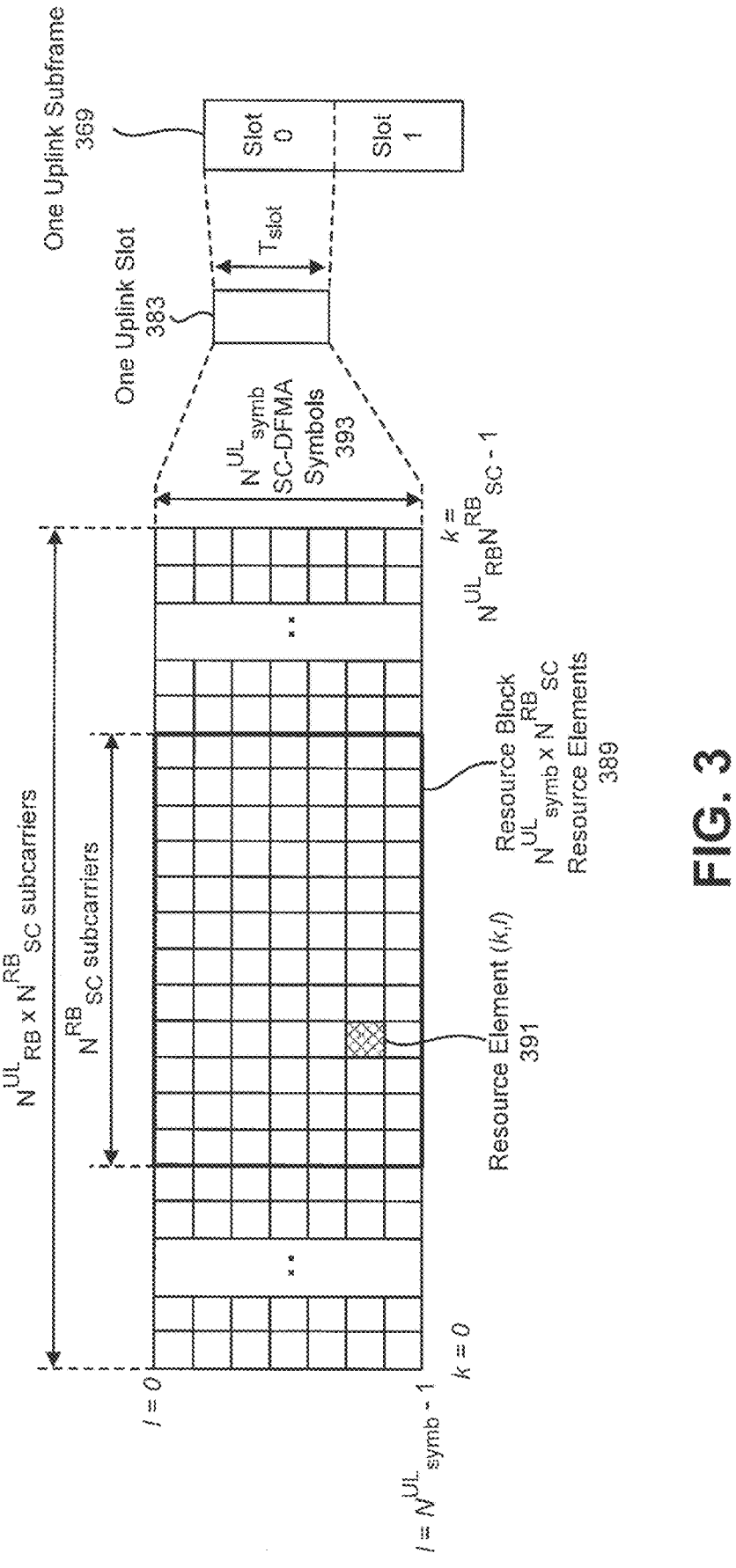
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For a SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM and/or DFT-S-OFDM symbols in time domain. A region defined by one sub-carrier in the frequency domain and one OFDM and/or DFT-S-OFDM symbol in the time domain is referred to as a RE and is uniquely identified by the index pair (k,l) in a slot, where k and 1 are indices in the frequency and time domains respectively. While uplink subframes in one component carrier (CC) are discussed herein, uplink subframes are defined for each CC.

Figure 4:
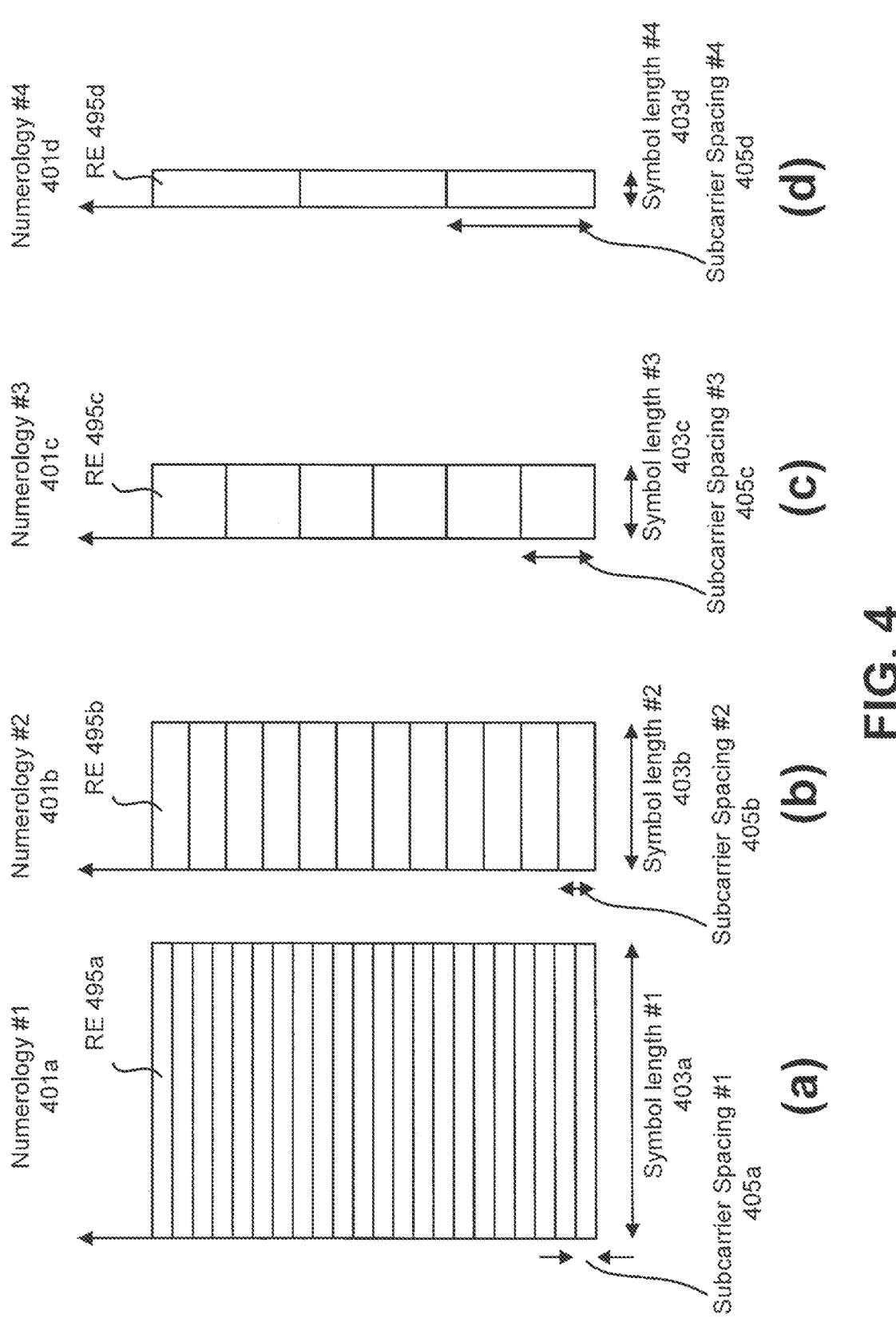
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to $15 \cdot 2^i$ and the effective OFDM symbol length $2048 \cdot 2^{-i} \cdot Ts$. It may cause the symbol length is $2048 \cdot 2^{-i} \cdot Ts + CP$ length (e.g., $160 \cdot 2^{-i} \cdot Ts$ or $144 \cdot 2^{-i} \cdot Ts$). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). In some examples, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. In some examples, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. In some examples, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. For instance, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 5:
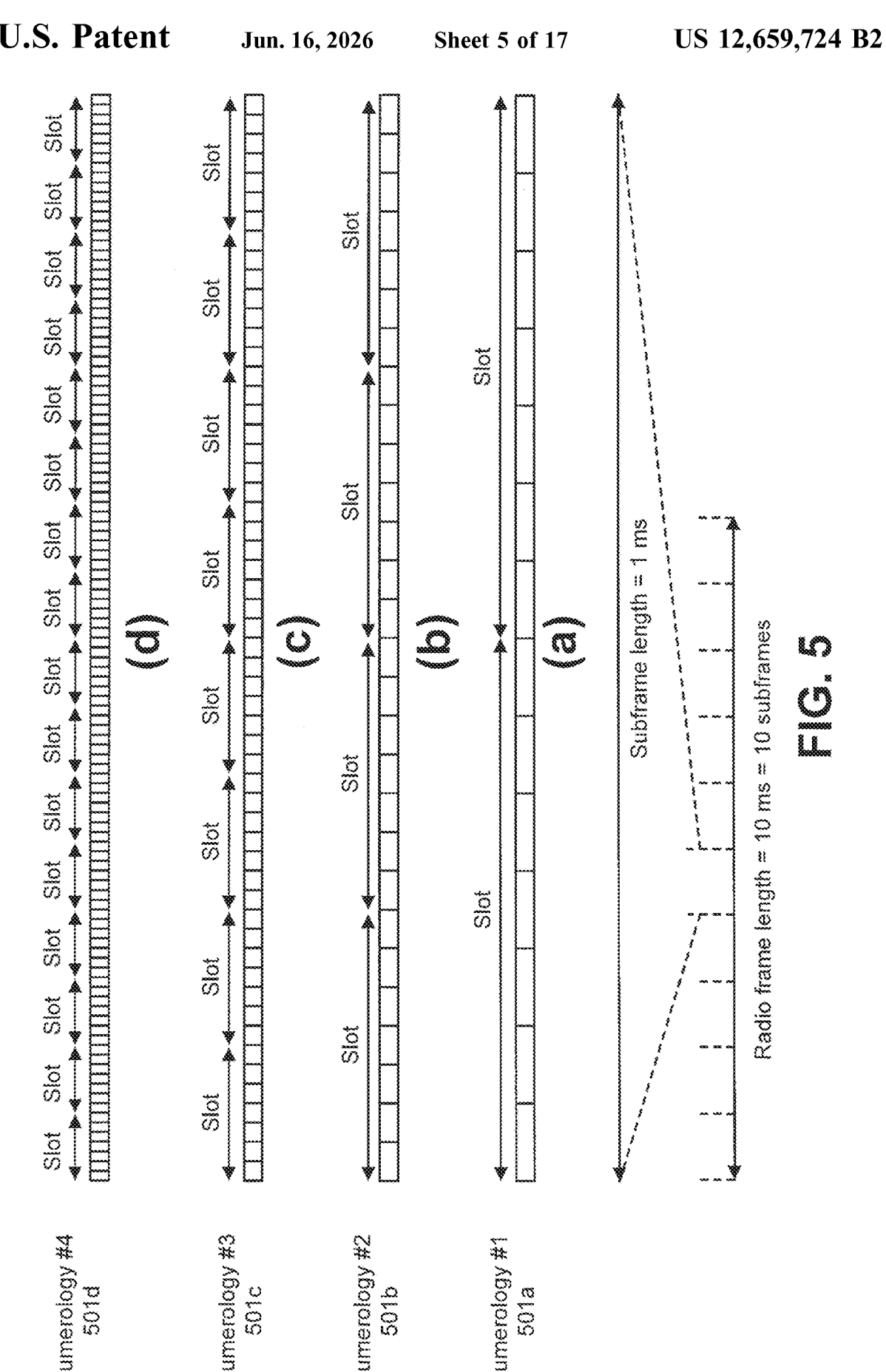
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
FIG. 6 shows examples of slots and sub-slots.

FIG. 6 shows examples of slots 683 and sub-slots 607. If a sub-slot 607 is not configured by higher layer, the UE 102 and the eNB and/or gNB 160 may only use a slot 683 as a scheduling unit. More specifically, a given transport block may be allocated to a slot 683. If the sub-slot 607 is configured by higher layer, the UE 102 and the eNB and/or gNB 160 may use the sub-slot 607 as well as the slot 683. The subslot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Figure 7:
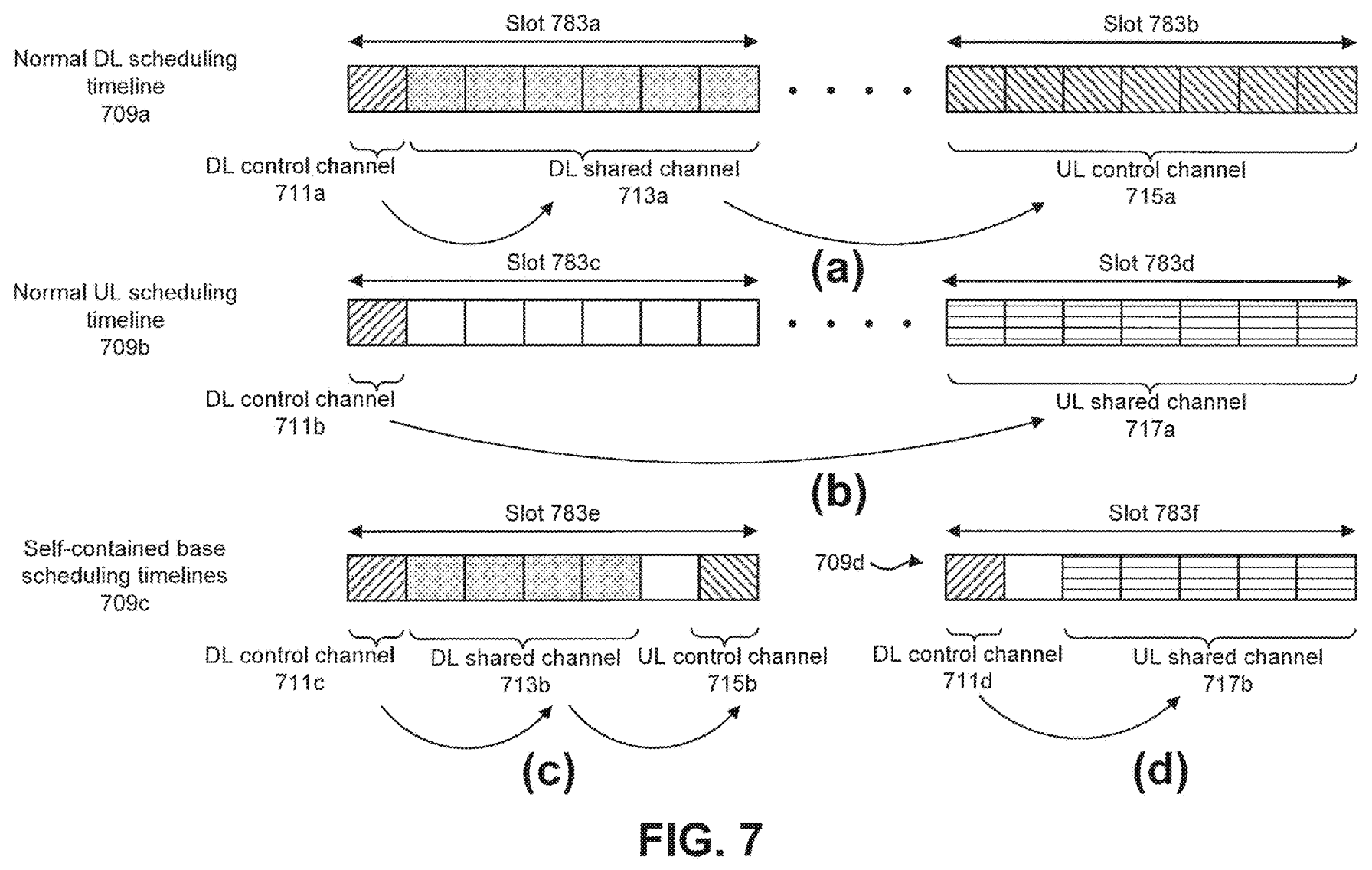

FIG. 7 shows examples of scheduling timelines 709. For a normal DL scheduling timeline 709a, DL control channels are mapped the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783b. In this instance, a given slot 783 may contain either one of DL transmission and UL transmission.

For a normal UL scheduling timeline 709b, DL control channels 711b are mapped the initial part of a slot 783c. The DL control channels 711b schedule UL shared channels 717a in a later slot 783d. For these cases, the association timing (time shift) between the DL slot 783c and the UL slot 783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709c, DL control channels 711c are mapped to the initial part of a slot 783e. The DL control channels 711c schedule DL shared channels 713b in the same slot 783e. HARQ-ACKs for the DL shared channels 713b are reported in UL control channels 715b, which are mapped at the ending part of the slot 783e.

For a self-contained base UL scheduling timeline 709d, DL control channels 711d are mapped to the initial part of a slot 783f. The DL control channels 711d schedule UL shared channels 717b in the same slot 783f. For these cases, the slot 783f may contain DL and UL portions, and there may be a guard period between the DL and UL transmissions.

The use of a self-contained slot may be upon a configuration of self-contained slot. Alternatively, the use of a self-contained slot may be upon a configuration of the subslot. Yet alternatively, the use of a self-contained slot may be upon a configuration of shortened physical channel (e.g., PDSCH, PUSCH, PUCCH, etc.).

Figure 8:
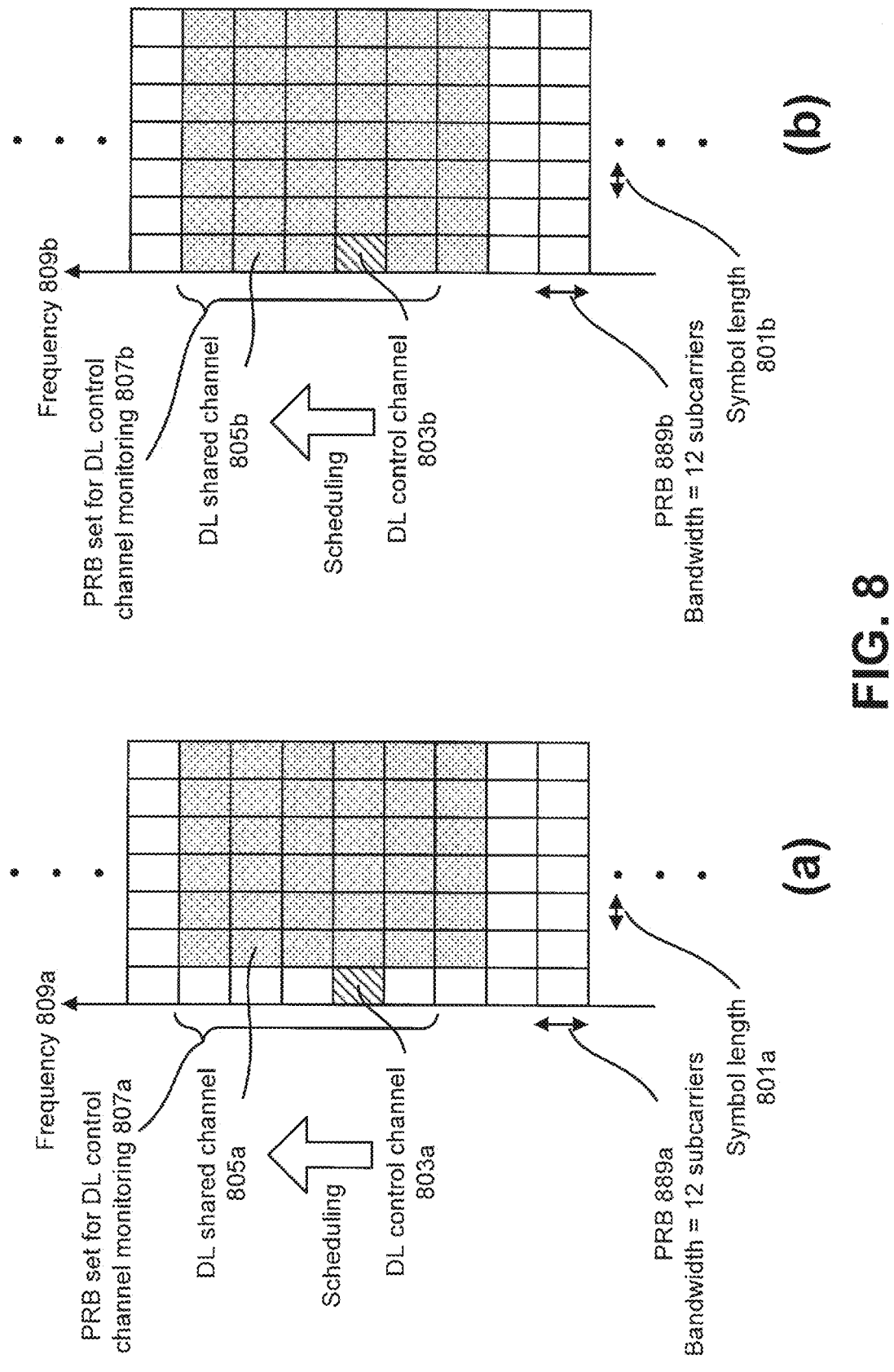
FIG. 8 shows examples of DL control channel monitoring regions.

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DMRS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
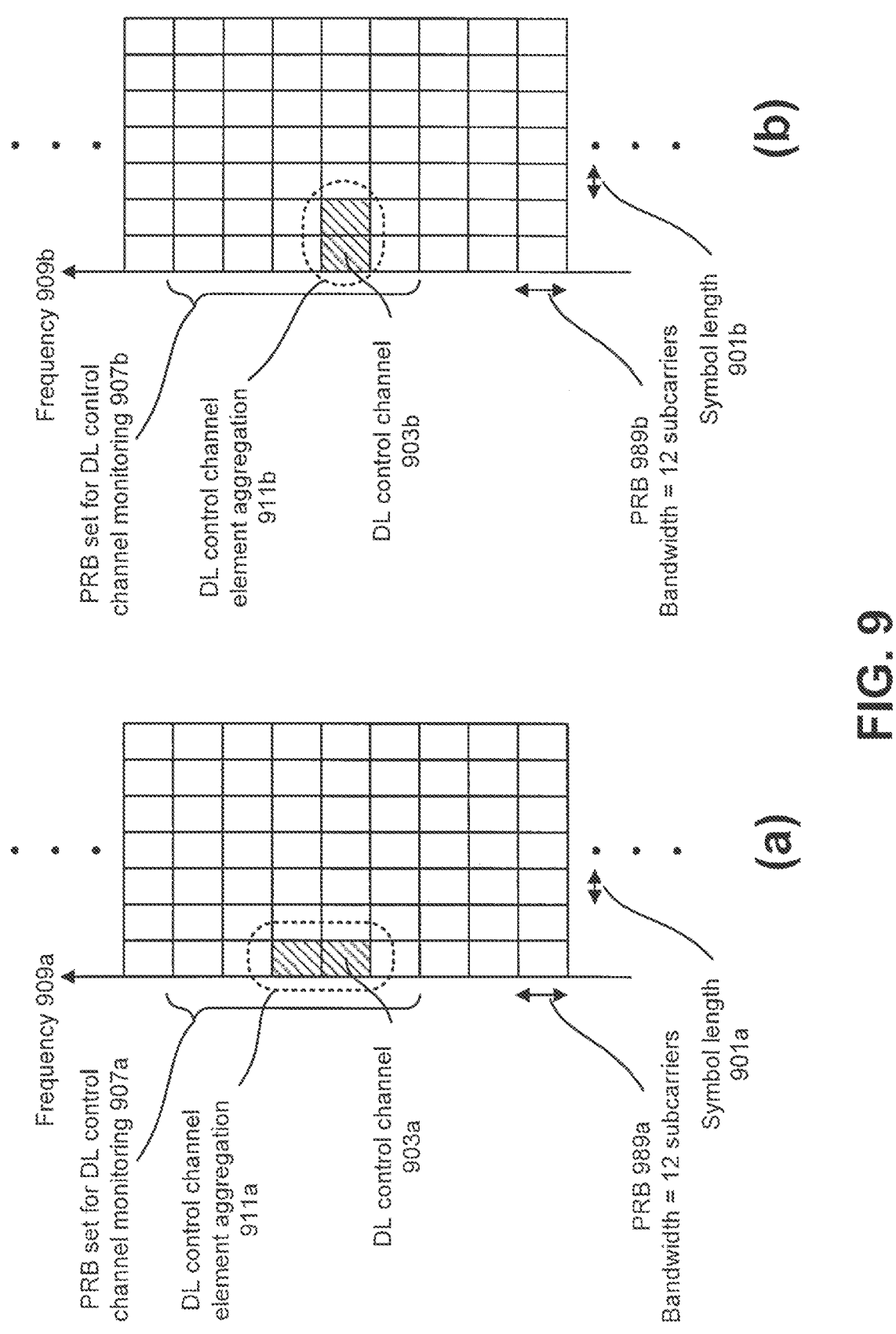
FIG. 9 shows examples of DL control channel which includes more than one control channel elements.

FIG. 9 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, for instance multiple DL control channel elements within an OFDM symbol are aggregated. Otherwise, DL control channel elements in different OFDM symbols can be aggregated.

Figure 10:
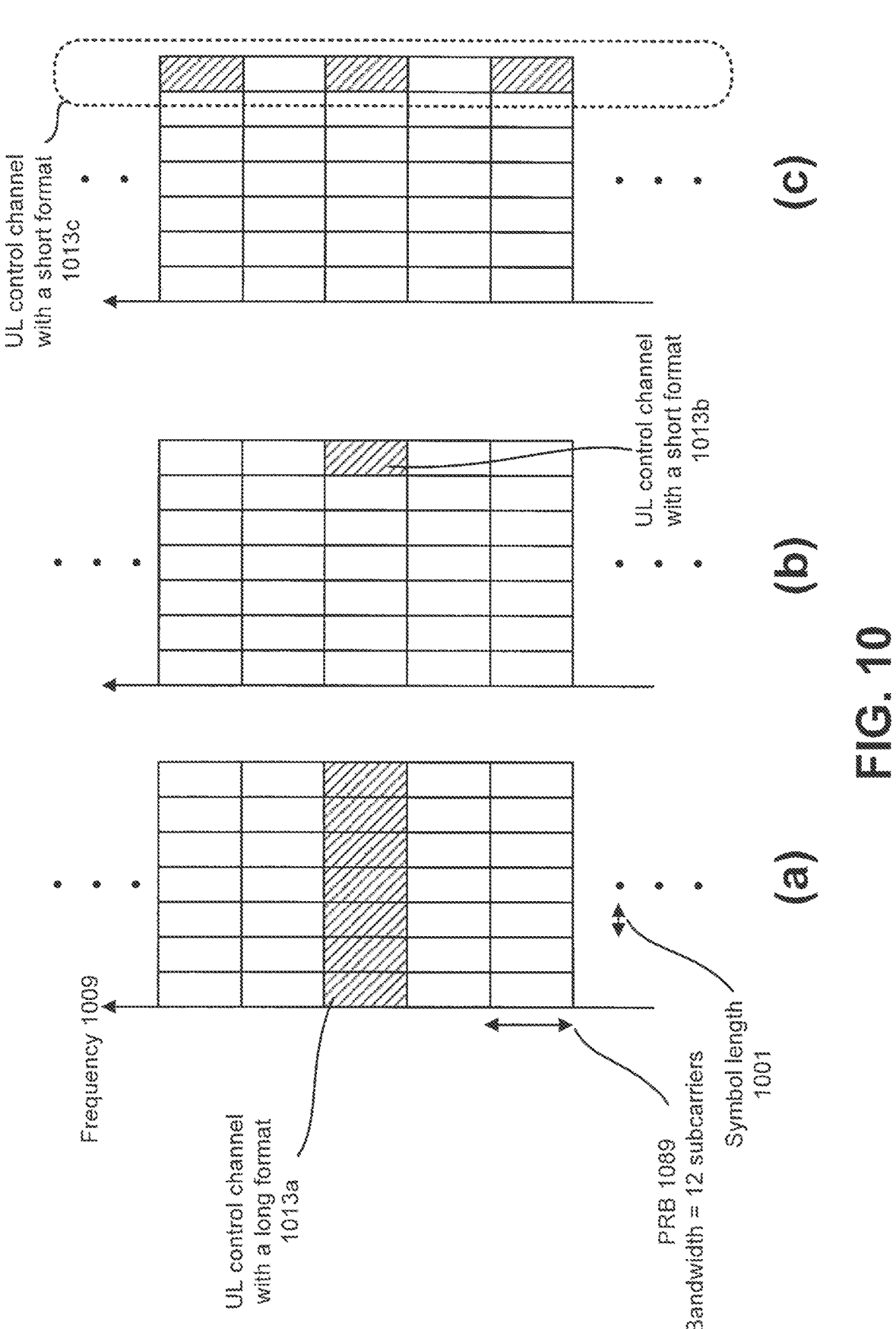
FIG. 10 shows examples of UL control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, for instance the UL control channel may be mapped to every N PRBs (e.g., 5 or 10) within a system bandwidth.

Figure 11:
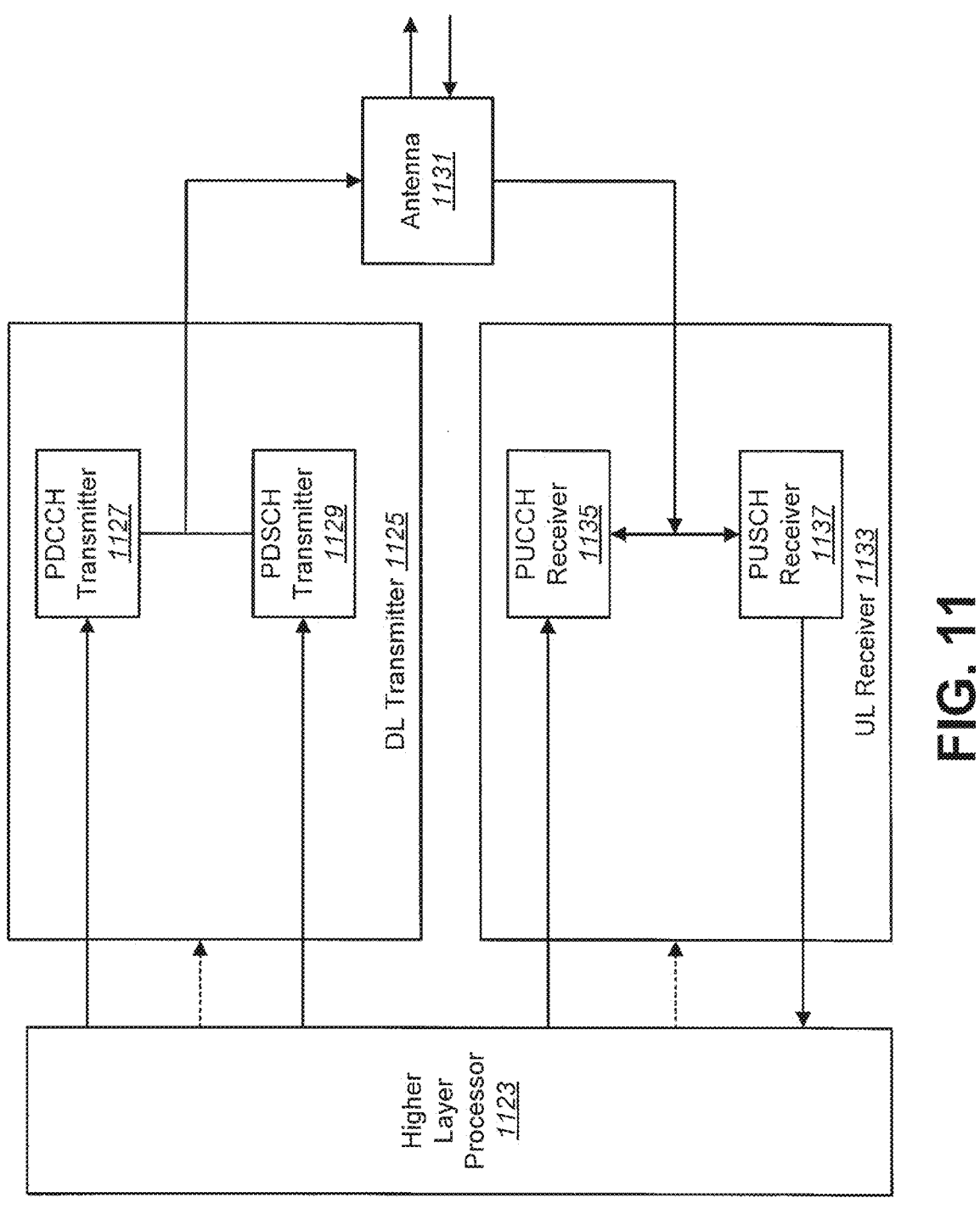
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send and/or acquire higher layer messages such as an RRC message and MAC message to and/or from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
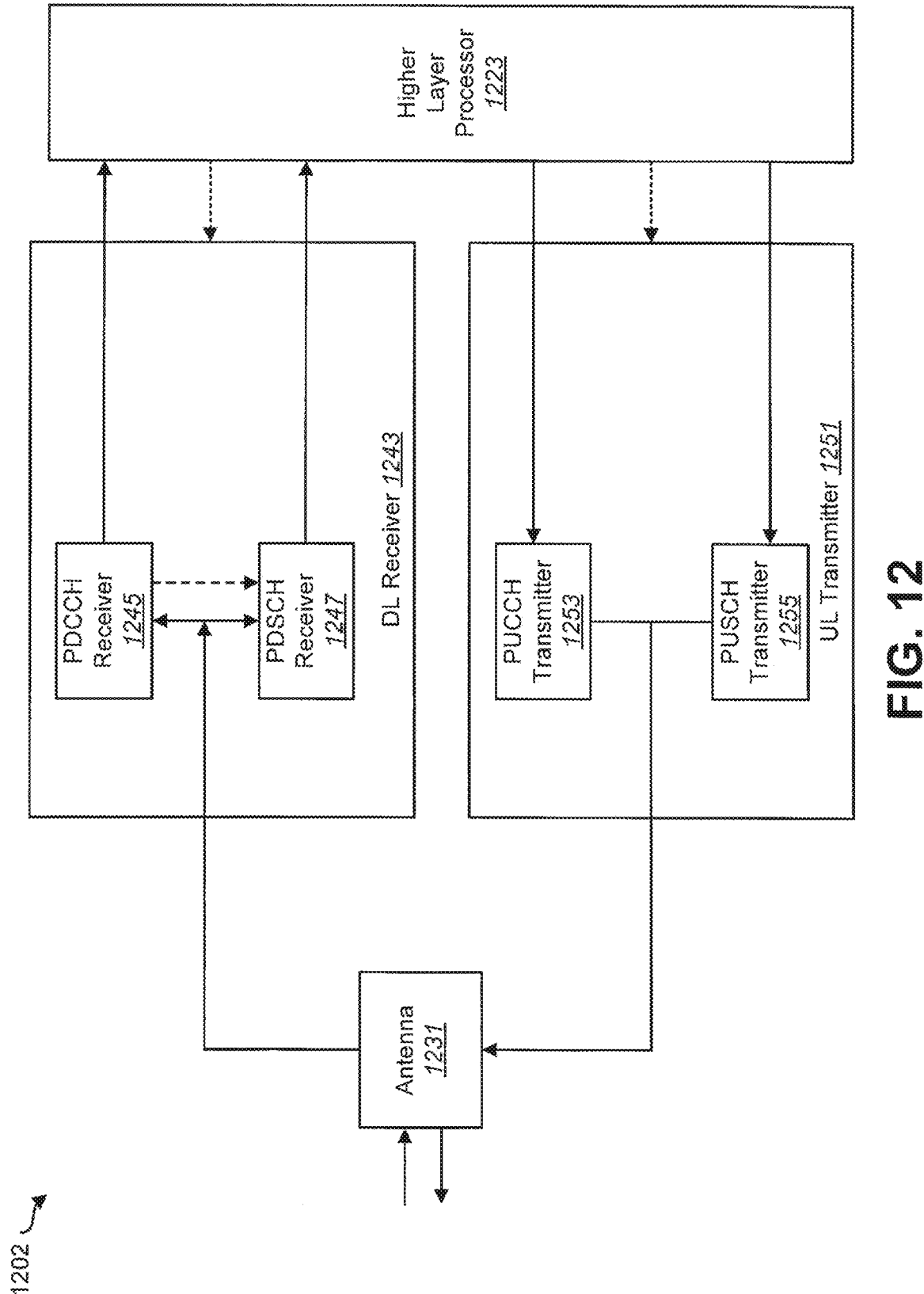
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send and/or acquire higher layer messages such as an RRC message and MAC message to and/or from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
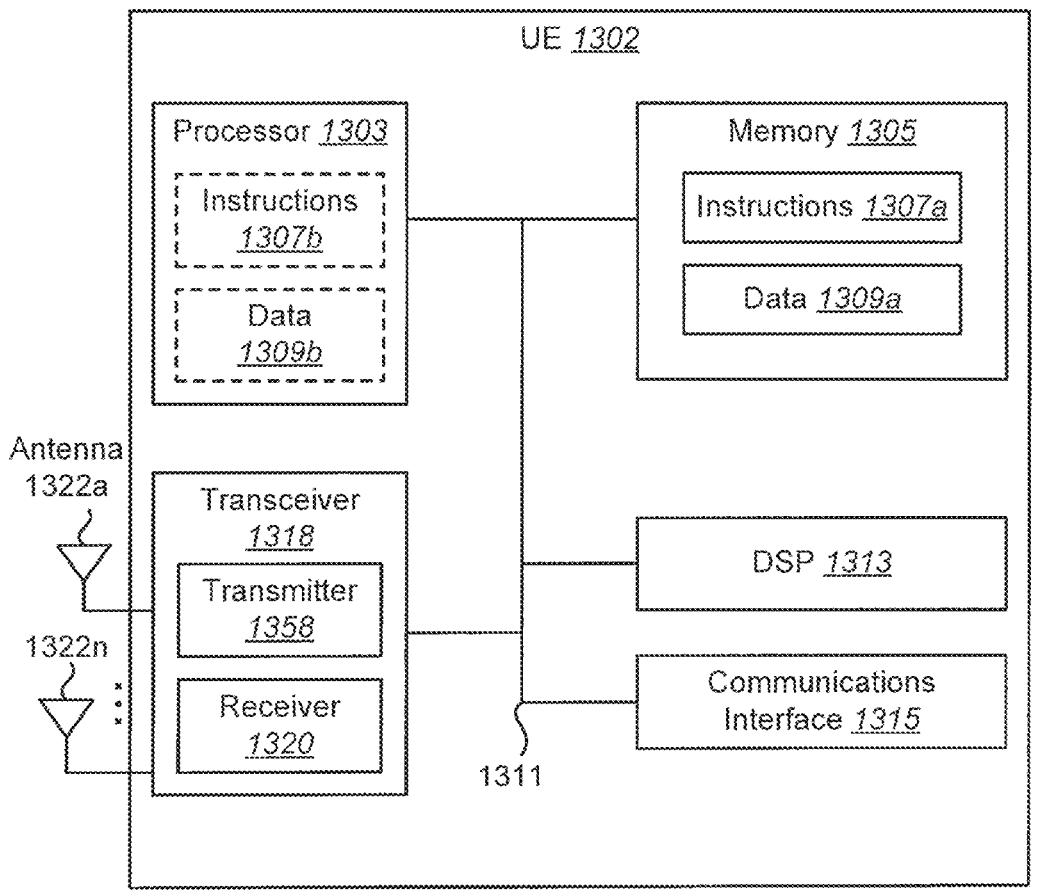
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random-access memory (NVRAM). Instructions 1307b and data 1309b may also reside in the processor 1303. Instructions 1307b and/or data

1309b loaded into the processor 1303 may also include instructions 1307a and/or data 1309a from memory 1305 that were loaded for execution or processing by the processor 1303. The instructions 1307b may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
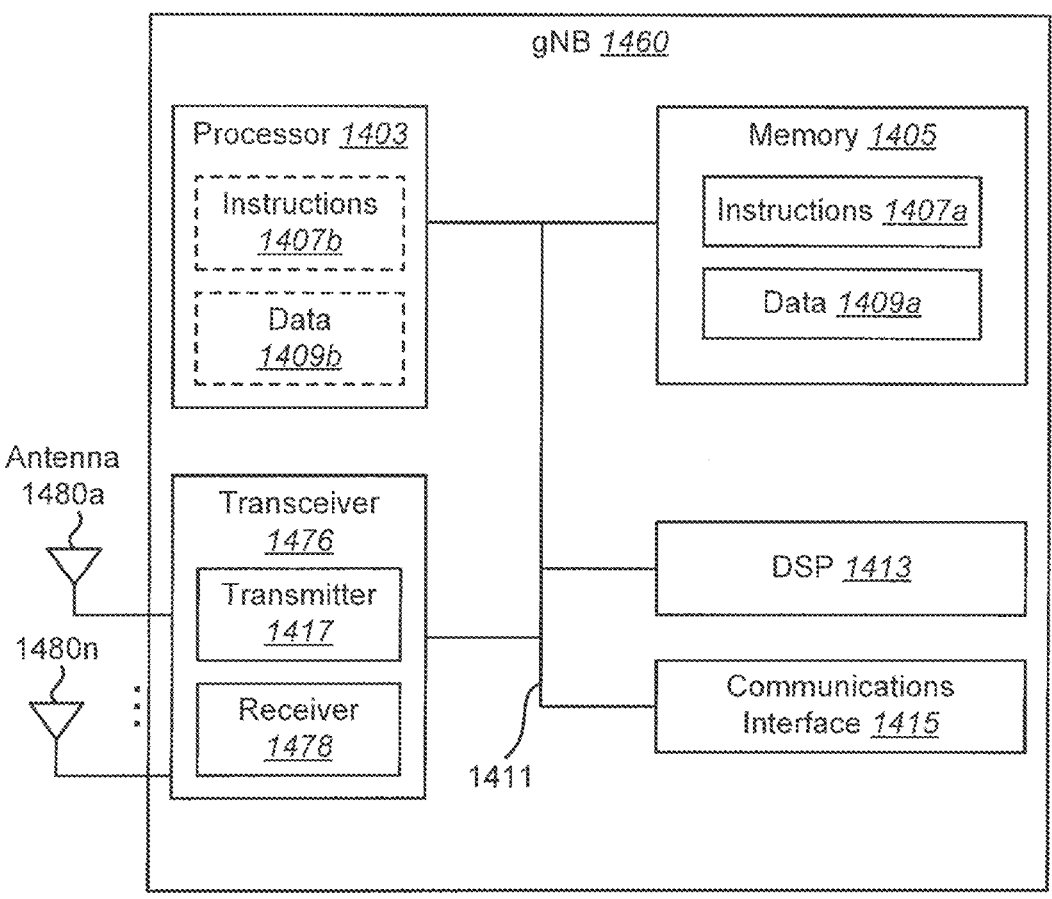
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include nonvolatile random-access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
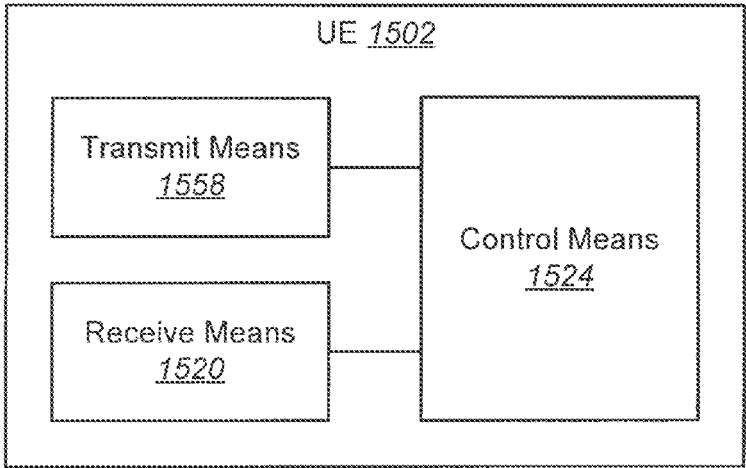
FIG. 15 is a block diagram illustrating one implementation of a UE in which systems and methods for resource allocations of enhanced uplink transmissions may be implemented.

FIG. 15 is a block diagram illustrating one implementation of a UE 1502 in which systems and methods for resource allocations of enhanced uplink transmissions may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
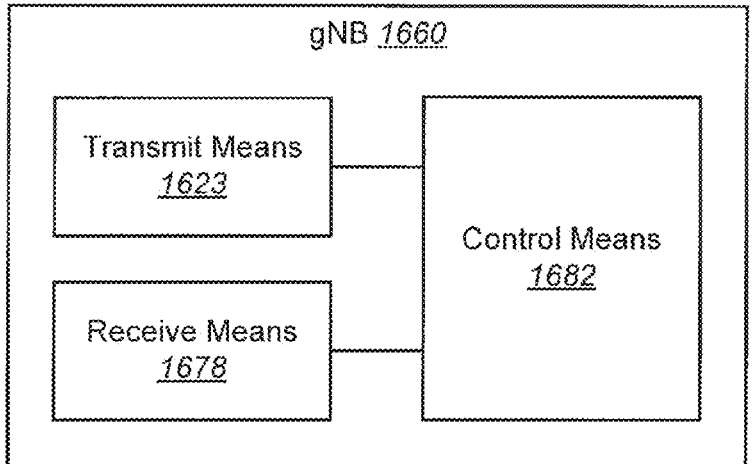
FIG. 16 is a block diagram illustrating one implementation of a gNB in which systems and methods for resource allocations of enhanced uplink transmissions may be implemented.

FIG. 16 is a block diagram illustrating one implementation of a gNB 1660 in which systems and methods for resource allocations of enhanced uplink transmissions may be implemented. The gNB 1660 includes transmit means 1623, receive means 1678 and control means 1682. The transmit means 1623, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
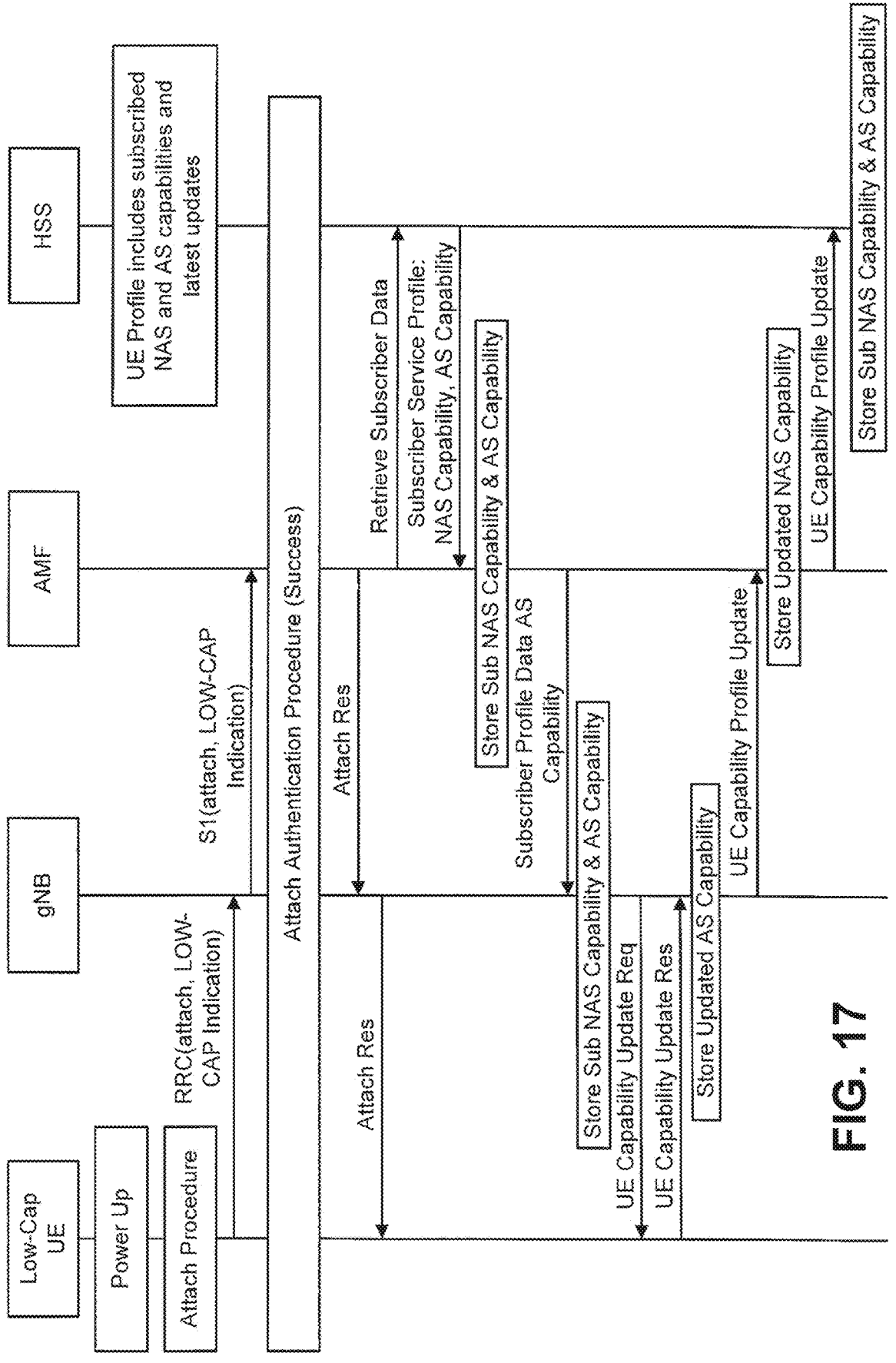
FIG. 17 is a sequence diagram illustrating an example of a LOW-CAP indication in the attach request.

FIG. 17 is a sequence diagram illustrating an example of a LOW-CAP indication in the attach request. In this example, the UE may be a LOW-CAP UE. The network may include a gNB, an Access and Mobility Management Function (AMF) and a Home Subscriber Server (HSS). The HSS may store a UE profile that includes subscribed NAS and AS capabilities and the latest updates.

The UE may power up. Upon powering up, the UE may initiate an attach procedure. The UE may send an RRC message to a gNB. In this example, the RRC message may be an attach request that includes a LOW-CAP indication.

The gNB may send the attach request and LOW-CAP indication in an S1 message to the AMF. The UE, gNB, AMF and the HSS may perform an attach authentication procedure. If the attach authentication procedure is successful, the AMF may send an attach response to the gNB, which forwards the attach response to the UE.

The AMP may send a message to the HSS to retrieve subscriber data for the UE. The HSS may send the subscriber service profile. In some examples, the subscriber service profile may include NAS and AS capabilities.

The AMF may store the subscriber NAS and AS capabilities. The AMF may send the subscriber profile data and AS capability to the gNB. The gNB may store the subscriber AS capability and updated AS capability.

The gNB may send a UE capability update request to the UE. The UE may respond with a complete capability profile in a UE capability update response. The gNB may store the updated AS capability. The gNB may send the updated UE capability profile to the AMF, which stores the updated NAS capability. The AMF may send the updated UE capability profile to the HSS, which stores the updated AS and NAS capability.

FIG. 18 is a sequence diagram illustrating an RRC connection establishment procedure. The UE may send an RRCSetupRequest to the network (e.g., gNB). The network may respond by sending an RRCSetup message to the UE. The UE may then send an RRCSetupComplete message back to the network.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field pro-grammable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the pres-ent time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A user equipment (UE), comprising:

transmitting circuitry configured to send a low-capability indication to a fifth generation (5G) New Radio (NR) network, the low-capability indication indicating that the UE is a UE with reduced capabilities, wherein the transmitting circuitry is further configured to send, in response to receiving a request from a base station, a capability profile, including information regarding the reduced capabilities of the UE, in a capability update response after the low-capability indication has been sent and while no connection release has occurred.

2. A base station (BS), comprising:

receiving circuitry configured to receive a low-capability indication from a user equipment (UE) in a fifth gen-eration (5G) New Radio (NR) network, the low-capa-bility indication indicating that the UE is a UE with reduced capabilities, wherein the receiving circuitry is further configured to receive, in response to sending a request to the UE, a capability profile, including information regarding the reduced capabilities of the UE, in a capability update response after the low-capability indication has been received and while no connection release has occurred.

3. A method performed by a user equipment (UE), the method comprising:

sending a low-capability indication to a fifth generation (5G) New Radio (NR) network, the low-capability indication indicating that the UE is a UE with reduced capabilities; and sending, in response to receiving a request from a base station, a capability profile, including information regarding the reduced capabilities of the UE, in a capability update response after the low-capability indication has been sent and while no connection release has occurred.

* * * * *